(12) United States Patent                (10) Patent No.:     US 10,137,805 B1
McKenzie                                  (45) Date of Patent:    Nov. 27, 2018

(54) RECLINING BABY CAR SEAT

(71) Applicant: Fay McKenzie, Royal Palm Beach, FL (US)

(72) Inventor: Fay McKenzie, Royal Palm Beach, FL (US)

( * ) Notice: Subject to any disclaimer, the term of this patent is extended or adjusted under 35 U.S.C. 154(b) by 94 days.

(21) Appl. No.: 15/402,507

(22) Filed: Jan. 10, 2017

(51) Int. Cl.
*A47C 1/08* (2006.01)
*B60N 2/28* (2006.01)

(52) U.S. Cl.
CPC ......... *B60N 2/2878* (2013.01); *B60N 2/2806* (2013.01); *B60N 2/2821* (2013.01)

(58) Field of Classification Search
CPC ...... B60N 2/2878; B60N 2/28; B60N 2/2803; B60N 2/2809; B60N 2/2812; B60N 2/2821; B60N 2/2845; B60N 2/2863; B60N 2/2875; B60N 2/3081; B60N 2/2892; B60N 2/42736; B60N 2/2806; B60R 22/105
USPC .. 297/256.13, 452.41, 250.1, 251, 253, 259, 297/296, 256.16, 238
See application file for complete search history.

(56) References Cited

U.S. PATENT DOCUMENTS

| | | | |
|---|---|---|---|
| 4,274,674 A * | 6/1981 | Deloustal | B60N 2/286 297/256.13 |
| 4,762,364 A * | 8/1988 | Young | B60N 2/2821 297/130 |
| D325,132 S | 4/1992 | Cone | |
| 5,524,964 A * | 6/1996 | Weimersheimer | B60N 2/14 297/256.1 |
| 5,609,393 A | 3/1997 | Meeker | |
| 6,196,629 B1 * | 3/2001 | Onishi | B60N 2/2806 297/256.12 |
| 6,679,552 B1 * | 1/2004 | Kassai | B60N 2/2812 297/250.1 |
| 6,739,661 B1 | 5/2004 | Dukes | |
| 7,246,855 B2 * | 7/2007 | Langmaid | B60N 2/2806 297/256.13 |
| 7,364,232 B2 * | 4/2008 | Mees van der Bijl | B60N 2/2821 297/183.4 |
| 7,413,249 B2 * | 8/2008 | Leutert | B60N 2/3081 297/237 |
| 8,220,871 B2 * | 7/2012 | Vertegaal | B60N 2/2821 297/250.1 |
| 8,251,446 B1 * | 8/2012 | Guerrido | A47D 1/002 297/250.1 |
| 8,899,678 B2 | 12/2014 | Doolan et al. | |
| 2002/0074840 A1 * | 6/2002 | Nakagawa | B60N 2/2821 297/256.16 |
| 2008/0182477 A1 | 7/2008 | Catelli | |
| 2001/0074194 | 3/2011 | Weber | |
| 2011/0285183 A1 * | 11/2011 | Poniatowski | B60N 2/2851 297/188.2 |
| 2012/0074748 A1 * | 3/2012 | Brunick | B60N 2/286 297/256.13 |
| 2012/0280540 A1 | 11/2012 | Pedraza | |

\* cited by examiner

*Primary Examiner* — Chi Q Nguyen
(74) *Attorney, Agent, or Firm* — Kyle A. Fletcher, Esq.

(57) ABSTRACT

The reclining baby car seat is a child safety seat that can be reconfigured into both an upright and a reclining position. In the upright position it provides comfortable safe seating for a small child. In the reclining position it accommodates a sleeping child. The reclining baby car seat may be motorized for ease of reconfiguration.

12 Claims, 4 Drawing Sheets

RECLINING BABY CAR SEAT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of child safety seats, more specifically, a child safety seat with a reclining position.

Child safety seats endeavor to provide a comfortable upright seating arrangement for a small child while at the same time providing a high level of safety during an accident. Typically, a child safety seat provides a cushioned seat and back, armrests, a restraint belt, and a base that can be secured to the vehicle using the vehicle seat belt or a LATCH (Lower Anchors and Tethers for Children) system or equivalent (UAS (Universal Anchorage System), Canfix (Canada), UCSSS (Universal Child Safety Seat System), or ISO 13216).

SUMMARY OF INVENTION

The reclining baby car seat is a child safety seat that can be reconfigured into a reclining position.

An object of the invention is to provide comfortable safe seating for a small child in an upright position.

Another object of the invention is to provide a reclining position for a sleeping child.

Another object of the invention is to provide a motorized mechanism for reconfiguring the reclining baby car seat.

Yet another object of the invention is to allow the reclining baby car seat to be reconfigured into an upright position or a reclining position while the child is occupying the seat.

These together with additional objects, features and advantages of thereclining baby car seat will be readily apparent to those of ordinary skill in the art upon reading the following detailed description of the presently preferred, but nonetheless illustrative, embodiments when taken in conjunction with the accompanying drawings.

In this respect, before explaining the current embodiments of the reclining baby car seat in detail, it is to be understood that the reclining baby car seat is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the reclining baby car seat.

It is therefore important that the claims be regarded as including such equivalent construction insofar as they do not depart from the spirit and scope of the reclining baby car seat. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. As used herein the word "or" is intended to be inclusive. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
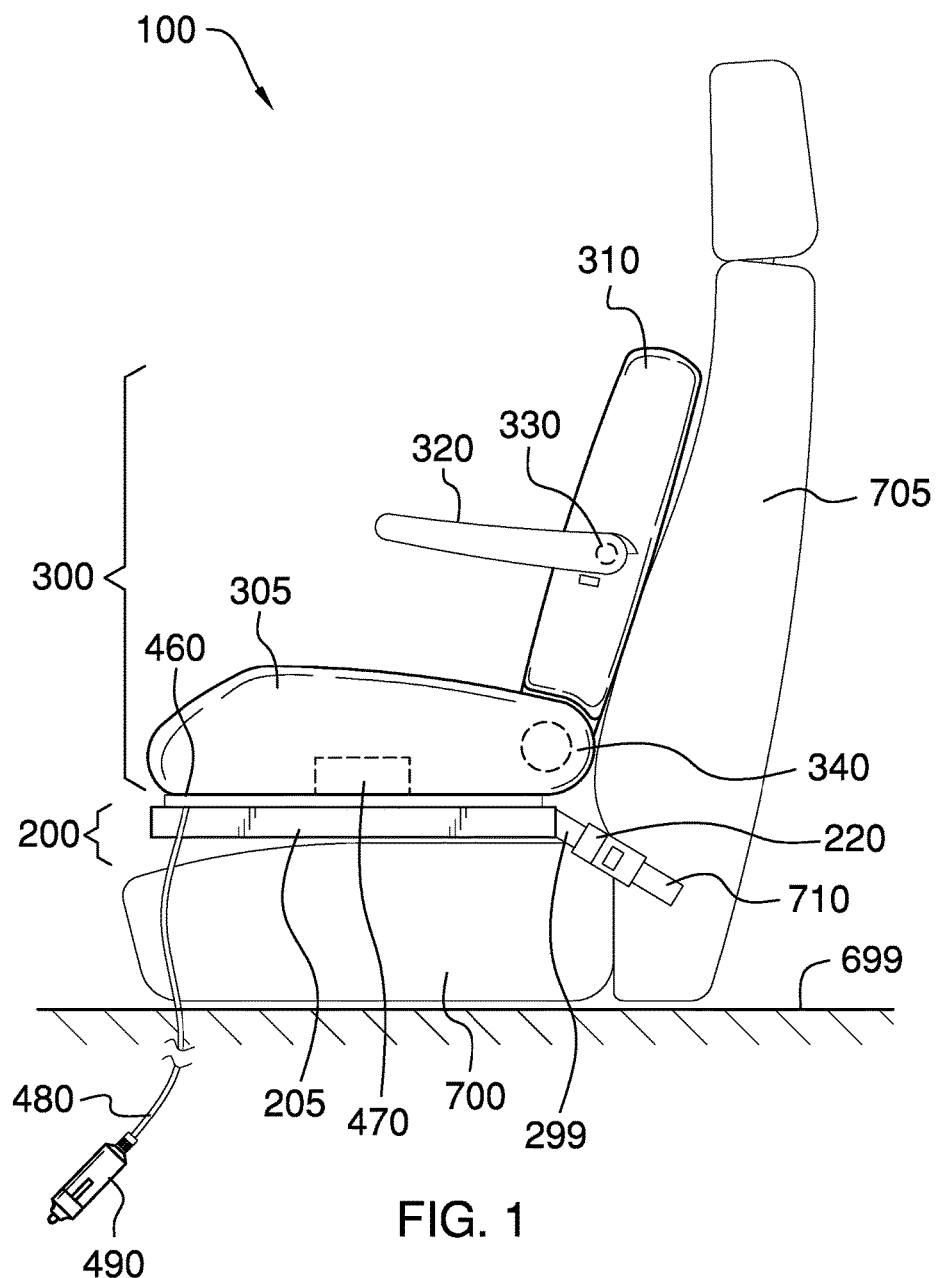
FIG. 1 is a side view of an embodiment of the disclosure while configured in the upright position.
Figure 2:
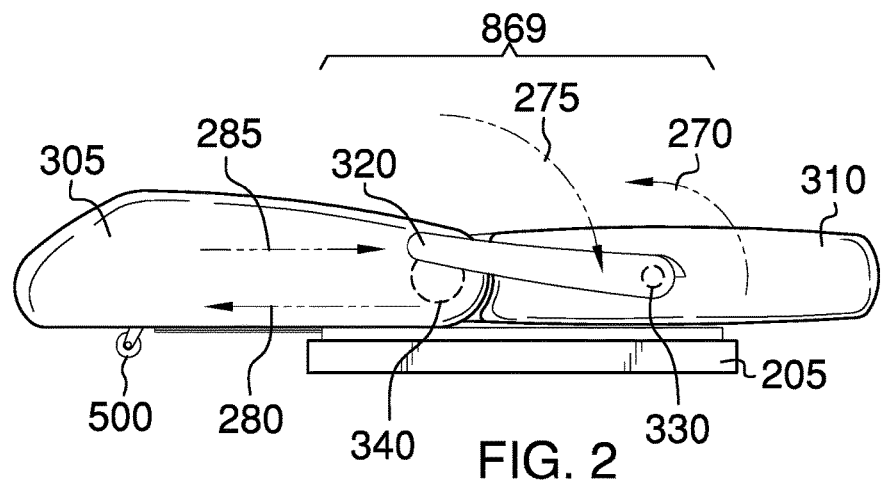
FIG. 2 is a side view of an embodiment of the disclosure while configured in the reclining position.
Figure 3:
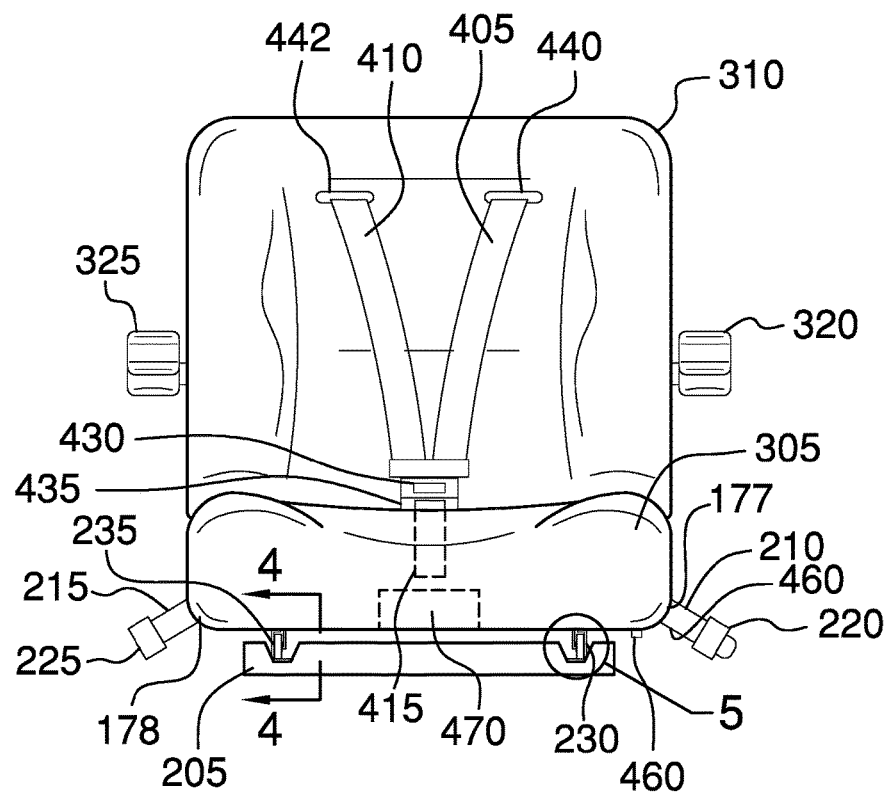
FIG. 3 is a front view of an embodiment of the disclosure while configured in the upright position.
Figure 4:
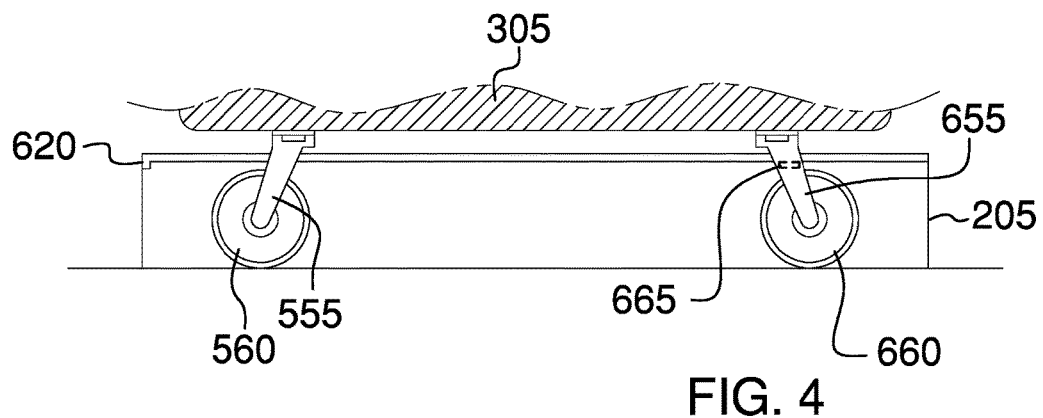
FIG. 4 is a cross-sectional view of an embodiment of the disclosure across 4-4 as shown in FIG. 2.
Figure 5:
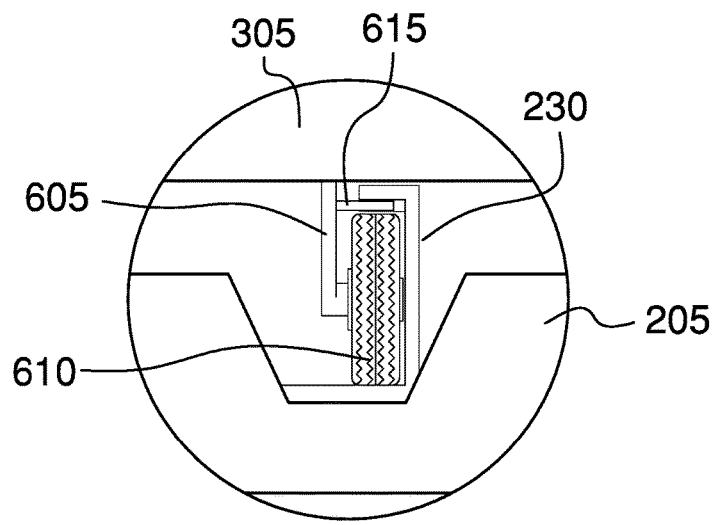
FIG. 5 is a detail view of a portion of the invention shown in FIG. 3 consistent with an embodiment of the disclosure.
Figure 6:
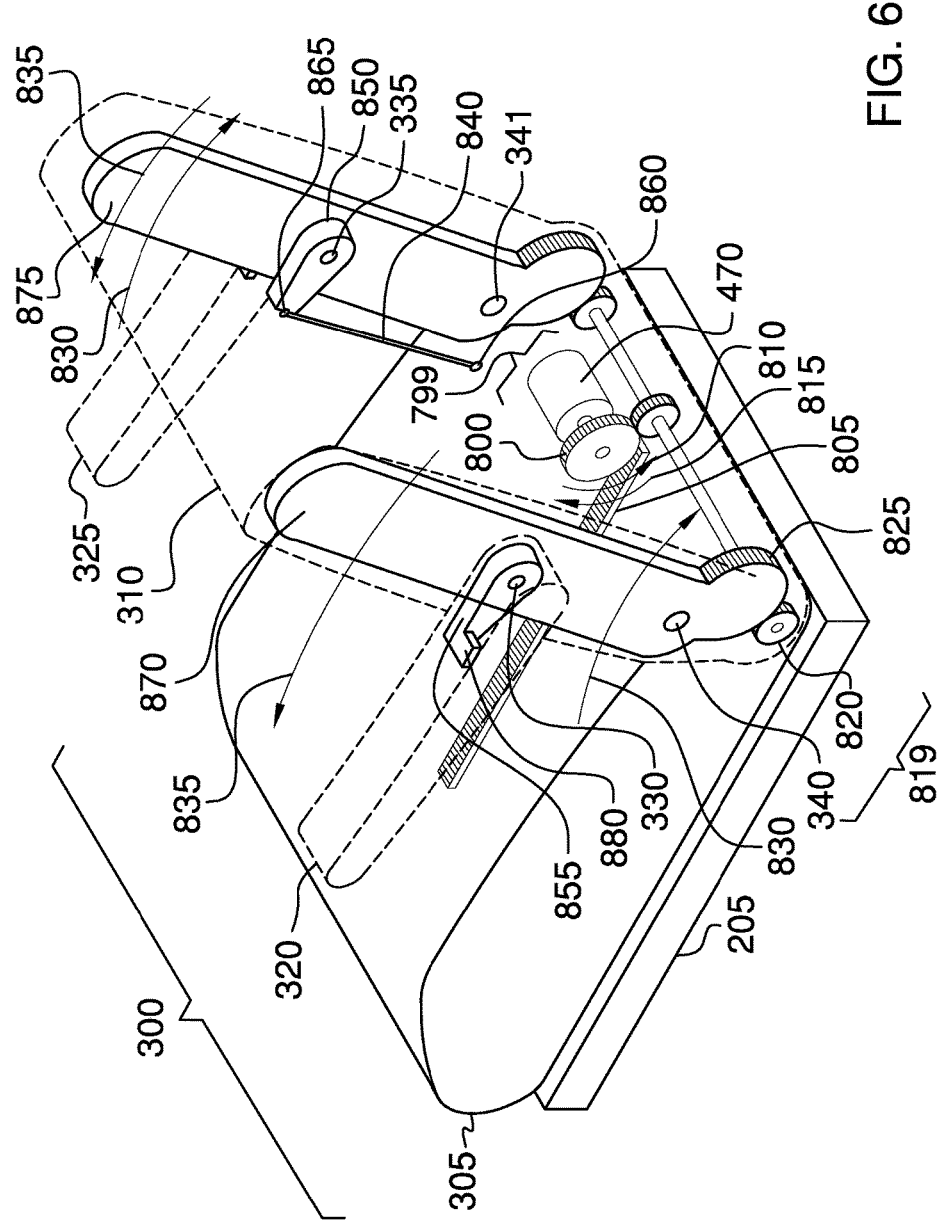
FIG. 6 is a perspective view of a portion of the interior mechanism consistent with an embodiment of the disclosure.

Detailed reference will now be made to a first potential embodiment of the disclosure, which is illustrated in FIGS. 1 through 6.

The reclining baby car seat 100 (hereinafter invention) comprises a car seat base subassembly 200 and a car seat passenger subassembly 300. The car seat passenger subassembly 300 is slidably interconnected with the car seat base subassembly 200 such that the car seat passenger subassembly 300 is reconfigured by having a car seat backrest 310 pivot backwards 275 from an upright position to a reclining position. The movement of the car seat passenger subassembly 300 is accompanied by forward motion 280 of the car seat passenger subassembly 300 relative to the car seat base subassembly 200. Furthermore, the car seat passenger subassembly 300 is reconfigured by having the car seat backrest 310 pivot forward 270 from a reclining position to an upright position accompanied by a rearward motion 285 of the car seat passenger subassembly 300 relative to the car seat base subassembly 200. The reclining car seat 100 is motorized and powered by the vehicle electrical system so the reconfigurations may be accomplished by activating an operator control 460 located on the invention 100.

The car seat base subassembly comprises a car seat base 205, a left lower anchor strap 210, a right lower anchor strap 215, a left lower anchor connector 220, a right lower anchor connector 225, at least one gear rack 805, a left wheel channel 230, and a right wheel channel 235. A proximal end of the left lower anchor strap 210 attaches securely to a left, rear section 177 of the car seat base 205. A distal end of the left lower anchor strap 210 attaches securely to the left lower anchor connector 220. A proximal end of the right lower anchor strap 215 attaches securely to a right, rear section 178 of the car seat base 205. A distal end of the right lower anchor strap 215 attaches securely to the right lower anchor connector 225. The left wheel channel 230 and the right wheel channel 235 are intended to retain and guide wheels that are mounted on the car seat passenger subassembly 300. The at least one gear rack 805 is used during seat motion and will be described later in this disclosure.

When installed in a vehicle 699, the bottom of the car seat base 205 rests on a vehicle seat cushion 700. The left lower anchor connector 220 clips onto a vehicle left lower anchor 710, which is securely mounted between the vehicle seat cushion 700 and the vehicle seat back 705. The right lower anchor connector 225 clips onto a vehicle right lower anchor 715, which is securely mounted between the vehicle seat cushion 700 and the vehicle seat back 705. Use of the lower anchors is intended to securely hold the car seat base 200 in position during an accident.

The car seat passenger subassembly 300 comprises a car seat bottom 305, a car seat backrest 310, a left armrest 320, a right armrest 325, a left armrest pivot 330, a right armrest pivot 335, a backrest pivot 340, a restraint belt subassembly 400, an electric motor 470, an operator control 460, a power cord 480, a cigarette lighter plug 490, a seat linear-motion subassembly 799, a backrest pivot-motion subassembly 819, an armrest pivot-motion subassembly 869, a left front wheel subassembly 500, a right front wheel subassembly 550, a left rear wheel subassembly 600, and a right rear wheel subassembly 650. The car seat bottom 305 is in pivotal arrangement with the car seat backrest 310. The pivot point between the car seat bottom 305 and the car seat backrest 310 is the backrest pivot 340. The left armrest 320 is pivotally mounted to the left side of the car seat backrest 310 at a point approximately halfway between the top and bottom of the car seat backrest 310. The pivot point of the left armrest 320 is the left armrest pivot 330. The right armrest 325 is pivotally mounted to the right side of the car seat backrest 310 at a point approximately halfway between the top and bottom of the car seat backrest 310. The pivot point of the right armrest 325 is the right armrest pivot 335.

The electric motor 470 is securely mounted to the underside of the car seat passenger subassembly 300 in such a position where it will not interfere with forward motion 280 or backward motion 285 of the car seat passenger subassembly 300. The electric motor 470 is powered via the power cord 480, which has a cigarette lighter plug 490 and plugs into the vehicle power system. The power cord 480 is routed through an operator control 460 so the presence and polarity of power to the electric motor 470 is determined by the position of the operator control 460.

In general, the operator control 460 may be one or more electrical switches. In some embodiments the operator control 460 may be a double-pole, double-throw, center-off rocker switch that causes the electric motor 470 to turn in one direction when the operator control 460 is pressed on a first side, causes the electric motor 470 to turn in the opposite direction when the operator control 460 is pressed on a second side, and prevents the electric motor 470 from turning at all when the operator control 460 is not activated. In some embodiments the operator control 460 may be a combination of two or more electrical switches that are disguised behind an ornamental feature of the reclining baby car seat 100.

As a non-limiting example, an embodiment might hide an 'upright' switch (not depicted) behind an 'upright' plastic embossment on one side of the car seat passenger subassembly 300 and a 'recline' switch (not depicted) behind a plastic embossment on the opposite side of the car seat passenger subassembly 300 with the two switches wired to the electric motor 470 and power cord 480 such that depressing the 'upright' plastic embossment causes the invention 100 to reconfigure to the upright position and pressing the 'recline' plastic embossment causes the invention 100 to reconfigure to the reclining position. In some embodiments, the invention 100 may include interlocks (not depicted) to remove electrical power from the electric motor 470 when the reclining baby car seat reaches an extreme upright or reclining position.

In some embodiments, the electric motor 470 may directly or indirectly cause linear motion of the car seat passenger subassembly 300 when it is energized. In a preferred embodiment, the seat linear-motion subassembly 799 comprises at least one seat-motion gear 800 driven directly or indirectly by the electric motor 470 and engaged with at least one gear rack 805. The at least one gear rack 805 is securely mounted to the car seat base 205 to convert rotational movement of the electric motor 470 into linear motion of the car seat passenger subassembly 300 relative to the car seat base 205. In this exemplary embodiment, when the electric motor 470 is energized and turns in a first rotational direction 810 it drives the at least one seat-motion gear 800 in a counter-clockwise direction causing it to pull on the at least one gear rack 805 thus moving the car seat passenger subassembly forward relative to the car seat base 205. When the electric motor 470 is energized and turns in a second rotational direction 815 it drives the at least one seat-motion gear 800 in a clockwise direction causing it to push on the at least one gear rack 805 thus moving the car seat passenger subassembly backwards relative to the car seat base 205.

In some embodiments, the electric motor 470 may directly or indirectly cause pivoting motion of the car seat backrest 310 when it is energized. In a preferred embodiment, the backrest pivot-motion subassembly 819 comprises at least one backrest-motion gear 820 driven directly or indirectly by the electric motor 470 and engaged with at least one toothed extension of the backrest 825 to convert rotational movement of the electric motor 470 into a pivoting motion of the car seat backrest relative to the car seat bottom 305. In this exemplary embodiment, when the electric motor 470 is energized and turns in a first rotational direction 810 it drives the at least one backrest-motion gear 825 in a counter-clockwise direction causing it to pull on the at least one toothed extension of the backrest 825 thus causing a backwards pivoting 830 of the car seat backrest 310 relative to the car seat bottom 305. When the electric motor 470 is energized and turns in a second rotational direction 815 it drives the at least one backrest-motion gear 820 in a clockwise direction causing it to push on the at least one toothed extension of the backrest 825 thus causing a forward pivoting 835 of the car seat backrest 310 relative to the car seat bottom 305.

In some embodiments, the electric motor 470 may directly or indirectly cause a pivoting motion of the left armrest 330 and the right armrest 335 when it is energized. In a preferred embodiment, the armrest pivot-motion subassembly 869 comprises a left backrest support strut 870 and a right backrest support strut 875, a left armrest pivot base 855, a right armrest pivot base 850, a left armrest pivot rod 840, and a right armrest pivot rod 842. The purpose of the backrest support struts is to provide support for the car seat backrest 310 and to provide a mounting location for the armrests. Approximately halfway up the backrest support struts the embodiment may comprise a left armrest pivot base 855 on the left backrest support strut 870 and a right armrest pivot base 850 on the right backrest support strut 875. The embodiment may also comprise a left armrest 320 mounted on the left backrest support strut 870 and a right armrest 325 mounted on the right backrest support strut 875.

It is important to note during the following descriptions that the left and right sides of the car seat backrest 310 including the internal structure and method of mounting the armrests are mirror images of each other. At times it will be easier to call attention to components on the left side because they will provide a less obstructed view in FIG. 6. At other times it will be easier to call attention to components on the right side for the same reason. The description given for one side applies equally to the other side unless specifically noted.

Considering only the left side for a moment, the left armrest pivot base 855 mounts at the left armrest pivot 330. The left armrest 320 also mounts at the left armrest pivot 330. Although the left armrest 320 and the left armrest pivot base 855 both mount on the left backrest support strut 870 at the location of the left armrest pivot 330 they pivot independently of ach other except as shall be described. The left armrest pivot base 855 straddles the left backrest support strut 870—one half of the left armrest pivot base 855 lies on both sides of the left backrest support strut 870 and the two halves of the left armrest pivot base 855 are connect to each other through the hole that is the left armrest pivot 330. The two halves of the left armrest pivot base 855 move in unison—if the half of the left armrest pivot base 855 that is between the left backrest support strut 870 and the right backrest support strut 875 pivots up and back then the half of the left armrest pivot base 855 that is on the opposite side of the left backrest support strut 870 also pivots in the same direction and by the same angular distance. The same can be said for the right armrest pivot base 850. When the reclining baby car seat 100 is in the upright position the left armrest pivot base 855 remains stationary. The left armrest 320 may be pivoted clockwise manually to allow easier access for placing a child into the seat or for removing a child from the seat. The left armrest 320 may also be pivoted counter-clockwise manually to allow normal use of the armrest. However the left armrest 320 may only pivot counter-clockwise as far as a left armrest stop 880 allows. When the left armrest 320 is substantially horizontal, the bottom of the armrest internal frame (not depicted) will encounter the left armrest stop 880 and the left armrest stop 880 will prevent any furthering pivot motion by the left armrest 320. An equivalent mechanism exists on the right side of the seat.

Considering only the right side for a moment, in some embodiments, the right armrest pivot rod 842 is pivotally connected at a proximal end 860 to a point on the interior (not depicted) of the car seat bottom 305 and pivotally connected at a distal end 865 to the right armrest pivot base 850. The right armrest pivot rod 842 may cause the angular orientation of the right armrest pivot base 850 to change during a forward pivot 835 or a backwards pivot 830 of the car seat backrest 310. As the right backrest support strut 875 undergoes backwards pivoting 830 the right armrest pivot rod 842 will pull down on the front of the right armrest pivot base 850 thus allowing the right armrest 325 to drop farther before reaching the right armrest stop 885 (not visible on the right side and depicted as left armrest stop 880 on the left side). As the right backrest support strut 875 reaches a substantially horizontal orientation the right armrest 325 will also reach a substantially horizontal orientation. In this way the right armrest 325 is allowed to drop out of the way as the car seat backrest 310 completes a backward pivot 835 and the right armrest 325 is raised into a usable armrest position as the car seat backrest 310 completes a forward pivoting 830. The same can be said for the left side of the reclining baby car seat 100.

Alternative mechanical arrangements of gears, pulleys, cables, belts, rods, and other mechanical components can be envisioned to affect the motions of the reclining baby car seat 100 as described herein and the example mechanisms stated in this disclosure are not intended to limit the mechanical embodiment of the reclining baby car seat 100 as they relate to motion in any manner.

The restraint belt subassembly 400 may comprise a left top belt 410, a right top belt 405, a bottom belt 415 a top belt clasp 430, and a bottom belt clasp 435. In some embodiments, the left top belt 410, right top belt 405, and bottom belt 415 may be stitched together on the back side of the reclining baby car seat 100 to form a single Y-shaped belt. In some embodiments the individual belt sections may provide one or more tension adjustments. In a preferred embodiment, the top left belt 405 is passed from behind the reclining baby car seat 100 through a top left belt slot 440, the top right belt 410 is passed from behind the reclining baby car seat 100 through a top right belt slot 442, and the top left belt 405 and the top right belt 410 terminate in a top belt clasp 430. In a preferred embodiment, the bottom belt 415 passed up from underneath the car seat bottom 305 through a bottom belt slot (not depicted) and terminates in a bottom belt clasp 430. In use, the top left belt 405 and top right belt 410 are slipped over the child's head, the bottom belt 415 passes up between the child's legs, and the belt top clasp 430 is fastened to the bottom belt clasp 435.

In some embodiments, the top left belt 405 and top right belt 410 may terminate in their own individual clasp (not depicted) and the individual top right belt clasp and top left belt clasp may fasten to the bottom belt clasp 435. In some embodiments the reclining baby car seat 100 may comprise an automatic belt retensioner (not depicted) to adjust the belt tension as the seat is moved into and out of a reclining position.

The left front wheel subassembly 500 comprises a left front wheel mount 505 and a left front wheel 510. The left front wheel mount 505 is securely fastened to the car seat bottom 305. The left front wheel 510 fits onto an axle (not depicted) of the left front wheel mount 505 and is free to rotate on the left front wheel mount 505. The left front wheel 510 fits within the left wheel channel 230 where is free to move except for the restraining action of the at least one seat-motion gear 800 against the at least one gear rack 805.

The right front wheel subassembly 550 comprises a right front wheel mount 555 and a right front wheel 560. The right front wheel mount 555 is securely fastened to the car seat bottom 305. The right front wheel 560 fits onto an axle (not depicted) of the right front wheel mount 555 and is free to rotate on the right front wheel mount 555. The right front wheel 560 fits within the right wheel channel 235 where is free to move except for the restraining action of the at least one seat-motion gear 800 against the at least one gear rack 805.

The left rear wheel subassembly 600 comprises a left rear wheel mount 605, a left rear wheel 610, and a left rear wheel stop 615. The left rear wheel mount 605 is securely fastened to the car seat bottom 305. The left rear wheel 610 fits onto an axle (not depicted) of the left rear wheel mount 605 and is free to rotate on the left rear wheel mount 605. The left rear wheel 610 fits within the left wheel channel 230 where is free to move except for the restraining action of the at least one seat-motion gear 800 against the at least one gear rack 805. The left rear wheel stop 615 prevents the left rear wheel 610 from exiting the left wheel channel 230 by moving too far forward.

The right rear wheel subassembly 650 comprises a right rear wheel mount 655, a right rear wheel 660, and a right rear wheel stop 665. The right rear wheel mount 655 is securely fastened to the car seat bottom 305. The right rear wheel 660 fits onto an axle (not depicted) of the right rear wheel mount 655 and is free to rotate on the right rear wheel mount 655. The right rear wheel 660 fits within the right wheel channel 235 where is free to move except for the restraining action of the at least one seat-motion gear 800 against the at least one gear rack 805. The right rear wheel stop 665 prevents the right rear wheel 660 from exiting the right wheel channel 235 by moving too far forward.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A reclining baby car seat comprising:
    a car seat base subassembly adapted to rest on a seat cushion of a vehicle and to securely fasten to the vehicle's lower anchors and tethers for children anchors;
    a car seat passenger subassembly is slidably interconnected with the car seat base subassembly;
    wherein the car seat passenger subassembly is able to move between an upright seating position and a reclining position;
    wherein the car seat base subassembly comprises a car seat base, a left lower anchor strap, a right lower anchor strap, a left lower anchor connector, a right lower anchor connector, at least one gear rack, a left wheel channel, and a right wheel channel;
    wherein a proximal end of the left lower anchor strap attaches securely to the left, rear section of the car seat base;
    wherein a distal end of the left lower anchor strap attaches securely to the left lower anchor connector;
    wherein a proximal end of the right lower anchor strap attaches securely to the right, rear section of the car seat base and a distal end of the right lower anchor strap attaches securely to the right lower anchor connector;
    wherein the left lower anchor connector clips onto a vehicle left lower anchor and the right lower anchor connector clips onto a vehicle right lower anchor.

2. The reclining baby car seat according to claim 1 wherein the left wheel channel and the right wheel channel retain and guide wheels that are mounted on the car seat passenger subassembly.

3. The reclining baby car seat according to claim 2 wherein the car seat passenger subassembly comprises a car seat bottom, a car seat backrest, a left armrest, a right armrest, a left armrest pivot, a right armrest pivot, a backrest pivot, a restraint belt subassembly, an electric motor, an operator control, a power cord, a cigarette lighter plug, a seat linear-motion subassembly, a backrest pivot-motion subassembly, an armrest pivot-motion subassembly, a left front wheel subassembly, a right front wheel subassembly, a left rear wheel subassembly, and a right rear wheel subassembly; wherein the car seat bottom is in pivotal arrangement with the car seat backrest; wherein the pivot point between the car seat bottom and the car seat backrest is the backrest pivot; wherein the left armrest is pivotally mounted to the left side of the car seat backrest at a point approximately halfway between the top and bottom of the car seat backrest; wherein the pivot point of the left armrest is the left armrest pivot; wherein the right armrest is pivotally mounted to the right side of the car seat backrest at a point approximately halfway between the top and bottom of the car seat backrest; wherein the pivot point of the right armrest is the right armrest pivot.

4. The reclining baby car seat according to claim 3 wherein the electric motor is mounted to an underside of the car seat passenger subassembly in such a position where the electric motor will not interfere with forward motion or backward motion of the car seat passenger subassembly; wherein the electric motor is powered via the power cord that includes the cigarette lighter plug; wherein the power cord is routed through an operator control able to determine the presence and polarity of power to the electric motor.

5. The reclining baby car seat according to claim 4 wherein the seat linear-motion subassembly comprises at least one seat linear-motion gear; wherein the at least one seat linear-motion gear is driven via the electric motor and engages with at least one gear rack which is mounted to the car seat base; wherein the at least one seat linear-motion gear converts rotational movement of the electric motor into linear motion of the car seat passenger subassembly relative to the car seat base.

6. The reclining baby car seat according to claim 5 wherein the backrest pivot-motion subassembly comprises at least one backrest-motion gear; wherein the at least one backrest-motion gear is driven via the electric motor and engages with at least one toothed extension of the backrest to convert rotational movement of the electric motor into a pivoting motion of the car seat backrest relative to the car seat bottom.

7. The reclining baby car seat according to claim 6 wherein an armrest pivot-motion subassembly comprises a left backrest support strut, a right backrest support strut, a left armrest pivot base, a right armrest pivot base, a left armrest pivot rod, and a right armrest pivot rod; wherein the left backrest support strut and the right backrest support strut provide support for the car seat backrest and provide a mounting location for the armrests; wherein a left armrest pivot base is pivotally mounted approximately halfway between the top and bottom of the left side of the left backrest support strut at the location of the left armrest pivot;

wherein a right armrest pivot base is mounted approximately halfway between the top and bottom of the right backrest support strut at the location of the right armrest pivot; wherein the left armrest mounts onto the left backrest support strut at the location of the left armrest pivot; wherein the right armrest mounts onto the right backrest support strut at the location of the right armrest pivot; wherein the left armrest pivot rod holds the left armrest pivot base substantially horizontal whether the car seat backrest is in the upright or reclining position; wherein the right armrest pivot rod holds the right armrest pivot base substantially horizontal whether the car seat backrest is in the upright or reclining position.

8. The reclining baby car seat according to claim 7 wherein the left armrest is pivotally mounted onto the left backrest support strut at the location of the left armrest pivot; wherein the right armrest is pivotally mounted onto the right backrest support strut at the location of the right armrest pivot; wherein the left armrest and the right armrest each pivot up to allow access for adaptive placement or removal of a child into the seat.

9. The reclining baby car seat according to claim 8 wherein the left armrest pivot rod is pivotally connected at a proximal end to a point on the interior of the car seat bottom and pivotally connected at a distal end to the left armrest pivot base; wherein the right armrest pivot rod is pivotally connected at a proximal end to a point on the interior of the car seat bottom and pivotally connected at a distal end to the right armrest pivot base; wherein the left armrest pivot rod causes the angular orientation of the left armrest pivot base to change during a forward pivot or a backwards pivot of the car seat backrest; wherein the right armrest pivot rod causes the angular orientation of the right armrest pivot base to change during a forward pivot or a backwards pivot of the car seat backrest.

10. The reclining baby car seat according to claim 9 wherein the restraint belt subassembly comprises a left top belt, a right top belt, a bottom belt a top belt clasp, and a bottom belt clasp; wherein the top left belt is passed from behind the reclining baby car seat through a top left belt slot, the top right belt is passed from behind the reclining baby car seat through a top right belt slot, and the top left belt and the top right belt terminate in a top belt clasp; wherein the bottom belt passed up from underneath the car seat bottom through a bottom belt slot and terminates in a bottom belt clasp; wherein the top left belt and top right belt are adapted to slip over the child's head, the bottom belt is adapted to pass up between the child's legs, and the belt top claps is fastened to the bottom belt clasp.

11. The reclining baby car seat according to claim 10 wherein the restraint belt subassembly comprises a belt retensioner to adjust the belt tension as the seat is moved into and out of a reclining position.

12. The reclining baby car seat according to claim 11 wherein the left front wheel subassembly comprises a left front wheel mount and a left front wheel, the right front wheel subassembly comprises a right front wheel mount and a right front wheel, the left rear wheel subassembly comprises a left rear wheel mount, a left rear wheel, and a left rear wheel stop; wherein the right rear wheel subassembly comprises a right rear wheel mount, a right rear wheel, and a right rear wheel stop; wherein the left front wheel mount, the right front wheel mount, the left rear wheel mount and the right rear wheel mount are fastened to the car seat bottom; wherein the left front wheel fits onto an axle of the left front wheel mount and is free to rotate on the left front wheel mount; wherein the right front wheel fits onto an axle of the right front wheel mount and is free to rotate on the right front wheel mount; wherein the left rear wheel fits onto an axle of the left rear wheel mount and is free to rotate on the left rear wheel mount; wherein the right rear wheel onto an axle of the right rear wheel mount and is free to rotate on the right rear wheel mount; wherein the left front wheel and the left rear wheel each fit within the left wheel channel where the left front wheel and the left rear wheel freely move; wherein right front wheel and the right rear wheel each fit within the right wheel channel where the right front wheel and the right rear wheel freely move; wherein the left rear wheel stop prevents the left rear wheel from exiting the left wheel channel by moving too far forward; wherein the right rear wheel stop prevents the right rear wheel from exiting the right wheel channel by moving too far forward.

* * * * *